US012739163B2

(12) United States Patent
Leung

(10) Patent No.: US 12,739,163 B2
(45) Date of Patent: Sep. 15, 2026

(54) METHODS AND SYSTEMS FOR REDUCING PACKET LOSS

(71) Applicant: Pismo Labs Technology Limited, Kowloon (HK)

(72) Inventor: Wan Chun Leung, Kowloon (HK)

(73) Assignee: Pismo Labs Technology Limited, Kowloon (HK)

( * ) Notice: Subject to any disclaimer, the term of this patent is extended or adjusted under 35 U.S.C. 154(b) by 406 days.

(21) Appl. No.: 18/599,095

(22) Filed: Mar. 7, 2024

(65) Prior Publication Data

US 2025/0286774 A1 Sep. 11, 2025

(51) Int. Cl.

*H04L 41/0663* (2022.01)
*H04L 43/0829* (2022.01)
*H04L 45/00* (2022.01)

(52) U.S. Cl.

CPC ...... *H04L 41/0663* (2013.01); *H04L 43/0829* (2013.01); *H04L 45/22* (2013.01)

(58) Field of Classification Search

CPC .. H04L 41/0663; H04L 43/0829; H04L 45/22
See application file for complete search history.

(56) References Cited

U.S. PATENT DOCUMENTS

| | | | | |
|---|---|---|---|---|
| 9,444,751 | B1 * | 9/2016 | Alresaini | H04L 47/30 |
| 11,601,227 | B2 * | 3/2023 | Decarreau | H04L 1/08 |
| 2016/0007228 | A1 * | 1/2016 | Soriaga | H04W 72/543 370/216 |
| 2019/0342201 | A1 * | 11/2019 | Singh | H04L 43/16 |
| 2021/0219369 | A1 * | 7/2021 | Zheng | H04W 24/10 |
| 2022/0321249 | A1 * | 10/2022 | Fu | H04W 28/0252 |
| 2023/0099586 | A1 * | 3/2023 | Xu | H04W 76/15 370/315 |
| 2023/0138379 | A1 * | 5/2023 | Fu | H04W 80/02 370/329 |
| 2023/0422112 | A1 * | 12/2023 | Lin | H04W 36/0072 |
| 2025/0070923 | A1 * | 2/2025 | Leng | H04L 1/189 |

* cited by examiner

*Primary Examiner* — Redentor Pasia
(74) *Attorney, Agent, or Firm* — Hershkovitz & Associates, PLLC; Abe Hershkovitz

(57) ABSTRACT

A method and system for data transmission at a first network device. When a first parameter reaches a first threshold and no packet is received before, the first network device may duplicate original data packets to form corresponding duplicated data packets. The first network device may transmit the original data packets through a primary tunnel and the duplicated data packets through at least one auxiliary tunnel. When a second parameter reaches a second threshold and no packet is received before, the first network device may transmit the original data packets through the at least one auxiliary tunnel.

20 Claims, 9 Drawing Sheets

METHODS AND SYSTEMS FOR REDUCING PACKET LOSS

TECHNICAL FIELD

The present invention relates generally to the field of computer networks. More particularly, the present invention discloses methods and systems for reducing packet loss during data packet transmission between network devices.

BACKGROUND ART

During data packet transmission, when a session is interrupted, most routers provide a basic failover function by searching for a backup tunnel to substitute the original tunnel and resume the session. This process may take a noticeable amount of time to complete. During the switching from the original tunnel to the backup tunnel, packet loss may occur, leading to disruptions in the data transmission process.

When a network device transmits data packets to another network device through the original tunnel, the network device may determine if those packets are received within a time threshold. If not, the network device may transmit the packets through the backup tunnel instead.

One skilled in the art should know that duplicating the same packet and transmitting through multiple tunnels may ensure the data packets are received by the designated device. The network device may select at least one auxiliary tunnel as the backup tunnel for transmitting at least one duplicated data packet. However, more bandwidth is occupied when the data packets are being duplicated.

Since the backup tunnel may be costly or does not have the best network performance, it is preferable to use the original tunnel rather than the backup tunnel unless the original tunnel is not performing well. Therefore, systems and methods are provided in the present invention to avoid packet loss during tunnel switching when the network performance of the original tunnel is worsening.

SUMMARY OF INVENTION

The present invention discloses methods and systems for reducing packet loss during data packet transmission between network devices. Originally, data packets were transmitted from a first network device to a second network device through a primary tunnel. When no packet is received by the first network device through the primary tunnel before a first parameter reaches a first threshold, the first network device may, whilst still transmitting original data packets to the second network device through the primary tunnel, duplicate the original data packets as at least one duplicated data packet and transmit the at least one duplicated data packet to the second network device through at least one auxiliary tunnel. When no packet is received by the first network device through the primary tunnel before a second parameter reaches a second threshold, the first network device transmits the original data packets to the second network device through a replacement tunnel, and stops transmitting any data packets to a second network device through the primary tunnel.

According to one of the embodiments of the present invention, when any packet is received by the first network device before a second parameter reaches a second threshold, the first network device continues to transmit the original data packets to the second network device through the primary tunnel, and stops transmitting any data packets to the second network device through the at least one auxiliary tunnel.

According to one of the embodiments of the present invention, when no packet is received by the first network device before a second parameter reaches a second threshold, the first network device transmits the original data packets to the second network device through the at least one auxiliary tunnel, and stop transmitting any data packets to the second network device through the primary tunnel.

According to one of the embodiments of the present invention, the first network device may select the primary tunnel and the at least one auxiliary tunnel, and may further select the replacement tunnel from the at least one auxiliary tunnel.

DESCRIPTION OF EMBODIMENTS

Figure 1A:
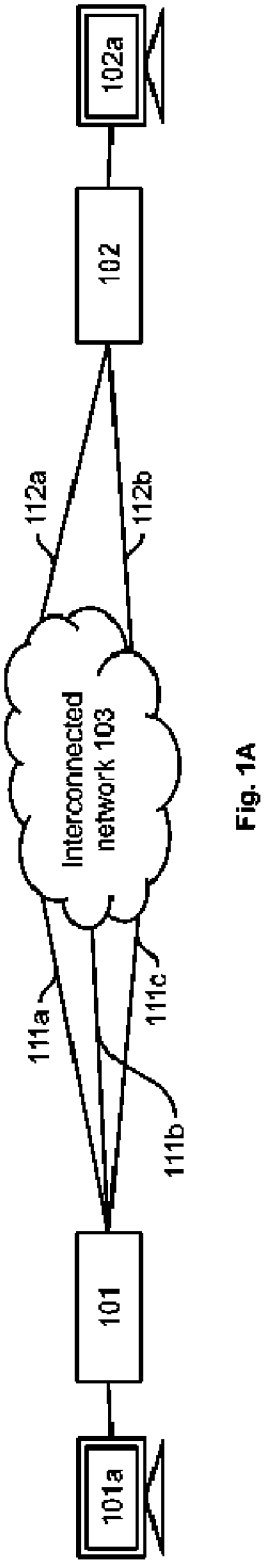
FIG. 1A is a schematic block diagram illustrating an exemplary network environment according to various embodiments of the present invention.

The terminology used herein is for the purpose of describing particular embodiments only and is not intended to be limited to example embodiments of the invention. As used herein, the singular forms "a", "an", and "the" are intended to include the plural forms as well, unless the context clearly indicates otherwise. As used herein, the terms "and/or" and "at least one of" include any and all combinations of one or more of the associated listed items. Expressions such as "at least one of," when preceding a list of elements, modify the entire list of elements and do not modify the individual elements of the list. The terms "comprises", "comprising", "includes" and "including", when used herein, specify the presence of stated features, integers, steps, operations, elements, and/or components, but do not preclude the presence or addition of one or more other features, integers, steps, operations, elements, components, and/or groups thereof. Also, the term "exemplary" is intended to refer to an example or illustration.

While processes, steps, methods, algorithms or the like described herein may be described in a sequential order, such processes, steps, methods and algorithms may be configured to work in alternate orders. In other words, any sequence or order of steps that may be described herein does not, in and of itself, indicate a requirement that the steps be performed in that order. The steps of described processes may be performed in any order practical.

When an element is referred to as being "on", "connected to", "coupled to", or "adjacent to" another element, the element may be directly connected or linked to another element. However, it should be understood that still another element may be present in the middle. On the other hand, when an element is referred to as being "directly connected" or "directly linked" to another element, it should be understood that there is no other component in the middle.

As used herein, the terms "non-transitory computer-readable storage media", "computer-readable medium", "main memory", "secondary storage medium", or "other storage medium" refers to any medium that participates in providing instructions to a processing unit for execution. The processing unit reads the data written in the primary storage medium and writes the data in the secondary storage medium. Therefore, even if the data written in the primary storage medium is lost due to a momentary power failure and the like, the data can be restored by transferring the data held in the secondary storage medium to the primary storage medium. Computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile storage includes dynamic memory. Transmission media includes coaxial cables, copper wire and fiber optics. Transmission media can also take the form of acoustic or light waves, such as those generated during radio-wave and infrared data communications.

A volatile storage may be used for storing temporary variables or other intermediate information during execution of instructions by a processing unit. A non-volatile storage or static storage may be used for storing static information and instructions for the processor, as well as various system configuration parameters.

The storage medium may include a number of software modules that may be implemented as software codes to be executed by the processing unit using any suitable computer instruction type. The software code may be stored as a series of instructions or commands, or as a program in the storage medium.

Various forms of computer-readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When the embodiments are to be implemented by software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single Carrier Frequency Division Multiple Access (SC-FDMA) and other networks. The terms "network" and "system" are often used interchangeably. A CDMA network may implement radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement radio technology such as Global System for Mobile Communications (GSM). An OFDMA network may implement radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of the Universal Mobile Telecommunication System (UMTS). 3GPP Long Term Evolution (LTE) is a UMTS that uses E-UTRA, which employs OFDMA on the downlink and SC-FDMA on the uplink. UTRA, E-UTRA, UMTS, LTE, 5G and GSM are described in documents from an organization named "3rd Generation Partnership Project" (3GPP). CDMA 2000 and UMB are described in documents from an organization named "3rd Generation Partnership Project 2" (3GPP2).

As used herein, a "tunnel" is a communication channel between two network devices that transmits data by encapsulating the data's Internet Protocol (IP) packets according to any suitable cryptographic tunneling protocol. A network device can be any electronic device, client, server, peer, service, application, or other object capable of sending, receiving, or forwarding information over communications channels in a network. Cryptographic tunneling protocols may include without limitation, Internet Protocol security (IPsec), Secure Socket Layer/Transport Layer Security (SSL/TLS), Datagram Transport Layer Security (DTLS), Microsoft Point-to-Point Encryption (MPPE), and Secure Shell (SSH).

FIG. 1A is a schematic block diagram illustrating an exemplary network environment according to various embodiments of the present invention. FIG. 1A comprises first network device 101, first local device 101*a*, second network device 102, second local device 102*a*, and interconnected network 103. First local device 101*a* is connected to a local area network (LAN) interface of first network device 101, and second local device 102*a* is connected to a LAN interface of second network device 102. There is no limitation on how a local device may be connected to a network device.

At least one first wide area network (WAN) link is established between at least one network interface of first network device 101 and interconnected network 103; and at least one second WAN link is established between at least one network interface of second network device 102 and interconnected network 103. The sum of the number of the first WAN link and the number of the second WAN link established should be equal to or more than three.

As illustrated in FIG. 1A, first network device 101 may establish three first WAN links 111*a* to 111*c* (collectively referred to as first WAN links 111) with interconnected network 103; and second network device 102 may establish two second WAN links 112*a* and 112*b* (collectively referred to as second WAN links 112) with interconnected network 103.

There are no limitations on the type of each of the first WAN links 111 and each of the second WAN links 112 established. It may be Wi-Fi, cable, cellular, satellite connections, etc. Interconnected network 103 may be a public network, a private network, or a combination of both, such as intranet, extranet, or internet.

In one variant, first network device 101 and second network device 102 may connect to more than one interconnected network.

Figure 2A:
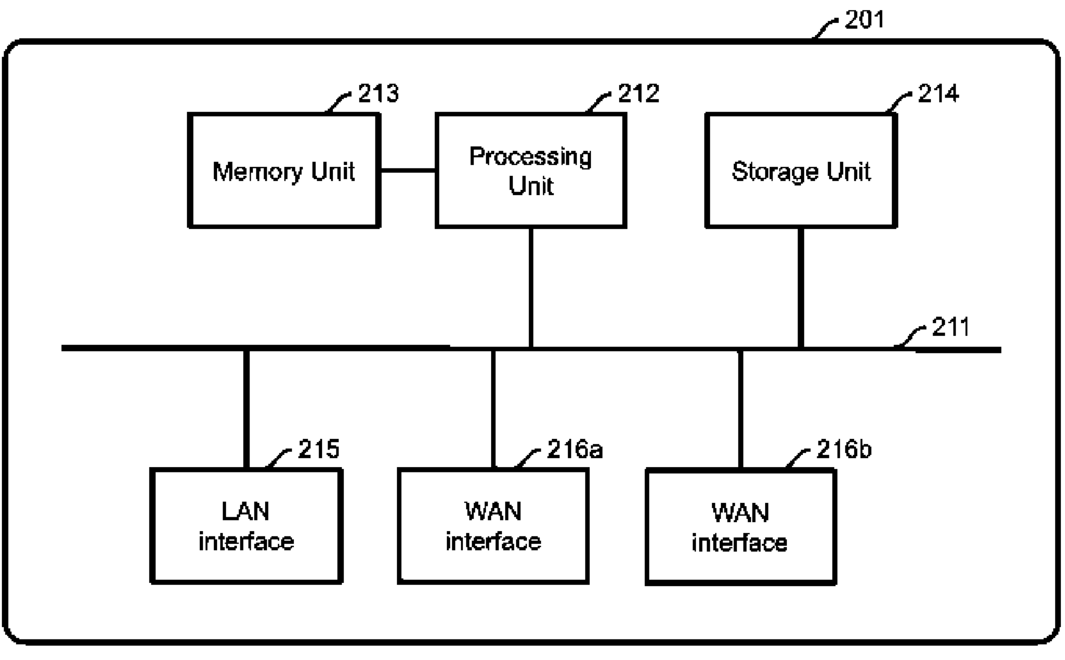
FIG. 2A is a schematic block diagram of a first network device according to the embodiments of the present invention.
Figure 2B:
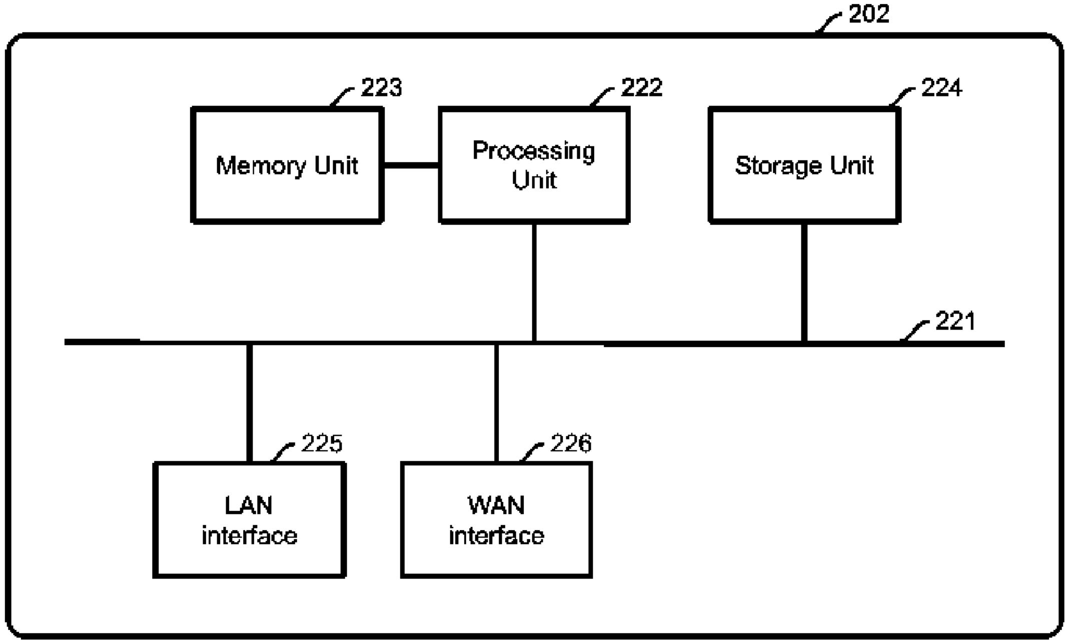
FIG. 2B is a schematic block diagram of a second network device according to the embodiments of the present invention.

For illustrative purposes, first network device 101 and second network device 102 exhibit function(s) parallel to first network device 201 and second network device 202 as demonstrated in FIGS. 2A and 2B respectively. Network devices 101 and 102 may work as a gateway, a router, a switch, an access point, a hub, a bridge, etc.

Figure 1B:
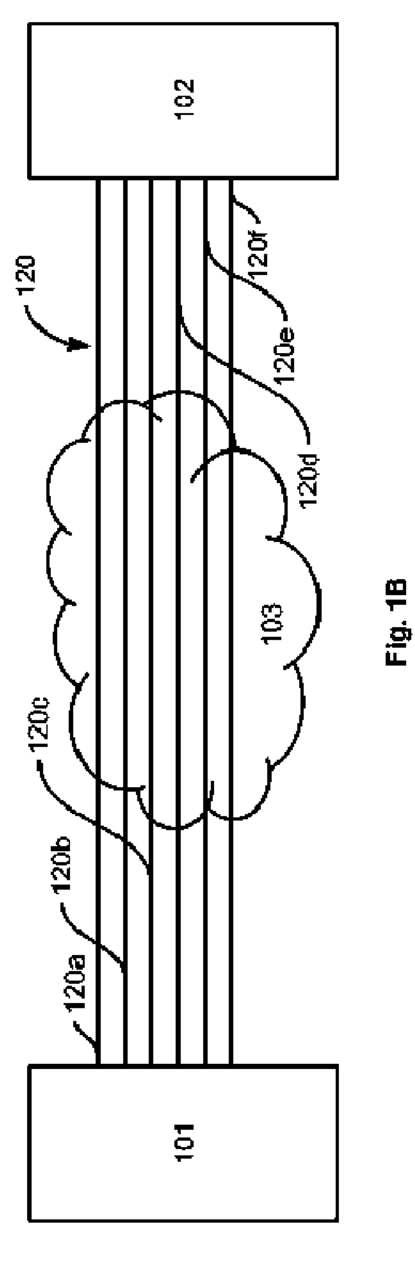
FIG. 1B illustrates a network environment according to the embodiments of the present invention.

FIG. 1B illustrates a network environment according to the embodiments of the present invention. FIG. 1B should be viewed in conjunction with FIG. 1A, and more than one tunnel may be established on top of first WAN links 111 and second WAN links 112. If there are M first WAN links established between first network device 101 and interconnected network 103, and N second WAN links established between second network device 102 and interconnected network 103, M×N connections may be established. First network device 101 may establish a tunnel by aggregating one or more connection(s) of the M×N connections. There is no limitation on the number of tunnels established; the number of tunnels established may be varied by the combination of the connections and the protocol.

In the illustrated embodiment, M is equal to three and N is equal to two, and therefore six connections may be established between first network device 101 and second network device 102. At least one tunnel may be established by aggregating one or more of the established connections. For simplification, six tunnels are established, such as tunnels 120*a*-120*f*, and each of them is established by aggregating one distinct connection of the six connections established.

FIG. 2A illustrates a schematic block diagram of a first network device according to the embodiments of the present invention. A processing unit of the first network device (such as processing unit 212 of first network device 201) may be connected to other hardware components, such as storage unit 214, at least one LAN interface, and at least one WAN interface by using a bus (such as bus 211). For illustrative purposes, in FIG. 2A, only LAN interface 215 is presented as the at least one LAN interface, and WAN interfaces 216*a* and 216*b* are presented as the at least one WAN interface. In some exemplary scenarios, however, when processing unit 212 has adequate pins, processing unit 212 may be directly connected to some of the peripheral hardware components, such as a storage unit; hence, the bus may not be used. Processing unit 212 may be directly connected to main memory unit 213 and bus 211. Processing unit 212 may execute program instructions or code segments stored in main memory unit 213 for implementing an exemplary embodiment of the present invention.

In one variant, first network device 201 may establish at least one WAN link through at least one LAN interface. One skill in the art may know that the number of LAN interfaces at first network device 201 should be equal to or greater than the number of WAN link(s) established.

In another variant, first network device 201 may further comprise at least one wireless communication module (WCM) and at least one antenna for establishing a cellular connection; the at least one WCM may be further connected to at least one SIM interface or at least one embedded universal integrated circuit card (eUICC) directly or through bus 211.

FIG. 2B illustrates a schematic block diagram of a second network device according to the embodiments of the present invention. A processing unit of the second network device (such as processing unit 222 of second network device 202) may be connected to other hardware components, such as storage unit 224, at least one LAN interface, and at least one WAN interface by using a bus (such as bus 221). For illustrative purposes, only LAN interface 225 is presented as the at least one LAN interface, and WAN interface 226 is presented as the at least one WAN interface in FIG. 2B. However, in some exemplary scenarios, when processing unit 222 has adequate pins, processing unit 222 may be directly connected to some of the peripheral hardware components, such as a storage unit; hence, the bus may not be used. Processing unit 222 may be directly connected to main memory unit 223 and bus 221. Processing unit 222 may execute program instructions or code segments stored in main memory unit 223 for implementing an exemplary embodiment of the present invention.

In one variant, second network device 202 may establish at least one WAN link through at least one LAN interface. One skill in the art may know that the number of LAN interfaces at network device 202 should be equal to or greater than the number of WAN link(s) established.

In one variant, second network device 202 may further comprise at least one WCM and at least one antenna for establishing a cellular connection; the at least one WCM may be further connected to at least one SIM interface or at least one eUICC directly or through bus 221.

Figure 3A:
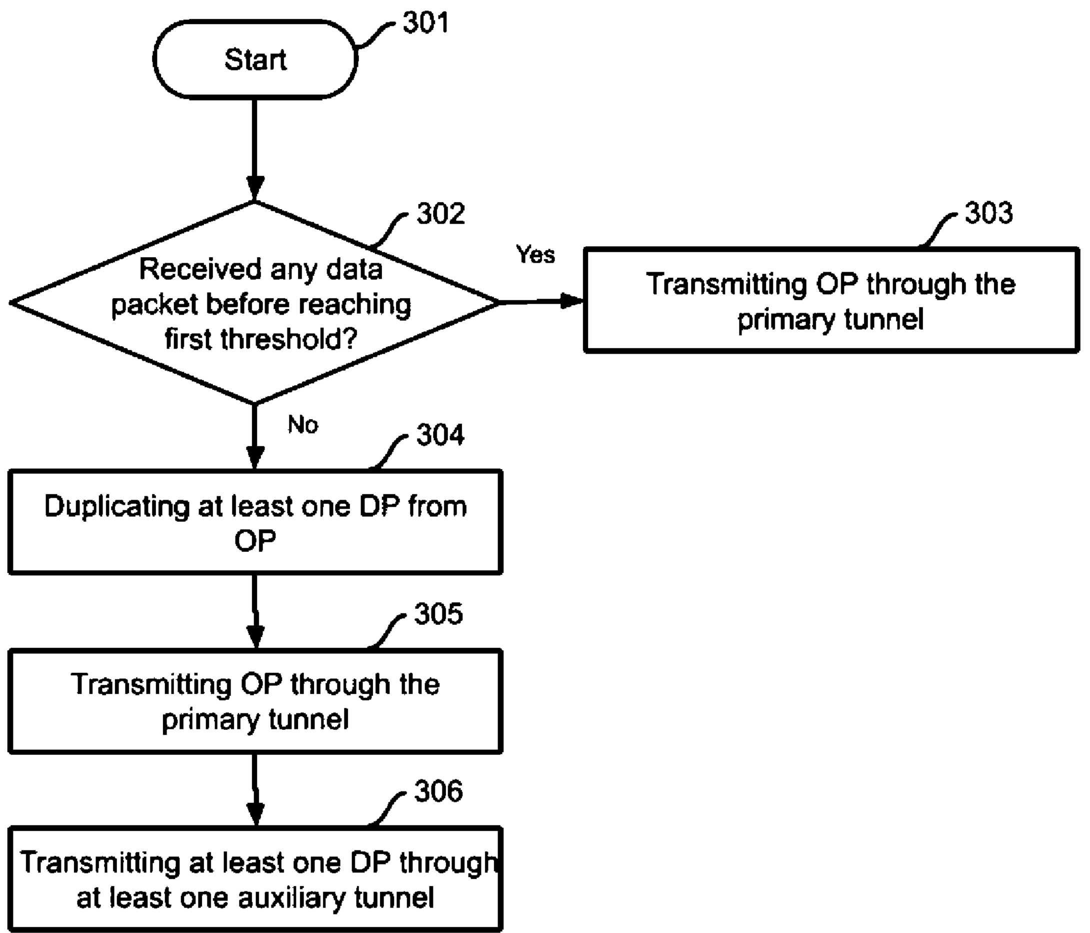
FIG. 3A is a flowchart illustrating one of the embodiments in the present invention.

FIG. 3A is a flowchart illustrating one of the embodiments in the present invention, which should be considered in conjunction with FIG. 1A, FIG. 1B, FIG. 2A, and FIG. 2B for better understanding. First network device 101 may perform the method illustrated in FIG. 3A to monitor the network condition of a particular tunnel. The particular tunnel may be a primary tunnel selected from the tunnels established between first network device 101 and second network device 102, or a primary tunnel selected from at least one tunnel being used for data packet transmission, but not in standby mode or idle mode. For example, tunnel 120*a* is the primary tunnel selected from the established tunnels 120*a-f*.

To ensure the primary tunnel remains alive in a specific time period, first network device 101 may send a heartbeat packet through each of the tunnels in a predefined time interval. The predefined time interval may vary. For example, the heartbeat packet is being sent every 5 s through a tunnel if the tunnel is in idle mode. There is no limitation on the format of the heartbeat packet and how the heartbeat packet is sent. The heartbeat packet may be an Internet Control Message Protocol (ICMP) packet, IP packet, or L2TP control packet being sent at any time. The heartbeat packet is small enough in size such that the network performance of the primary tunnel will not be affected.

In one embodiment, the specific time period may be at all times.

In another embodiment, the specific time period may be any time interval.

In another embodiment, the specific time period may be the establishment of a session if the primary tunnel is session-based.

In process 301, first network device 101 begins to monitor the particular tunnel. If more than one tunnel are established at the same time, it is possible for first network device 101 to monitor more than one particular tunnel concurrently.

In one variant, if more than one tunnel are established between first network device 101 and second network device 102 at the same time, an aggregated tunnel or an aggregated VPN connection may be established through the more than one tunnel. For example, tunnels 120*a*, 120*b* and 120*c* are aggregated to form one aggregated VPN connection.

One skilled in the art would appreciate that there are many methods to aggregate a plurality of tunnels to form one aggregated tunnel or connection. One of the methods is disclosed in the U.S. patent application Ser. No. 12/646,774, Filed Dec. 23, 2009, entitled "THROUGHPUT OPTIMIZATION FOR BONDED VARIABLE BANDWIDTH CONNECTIONS".

In process 302, first network device 101 may determine if a first parameter has reached a first threshold (hereafter "TH1"). If first network device 101 does receive any packet within TH1, then process 303 may be performed to transmit original data packets (hereafter "OPs") through the primary tunnel. Otherwise, process 306 may be performed.

In one preferred embodiment, the data type of the first parameter is time. When the first parameter has reached the first threshold, which indicates that the first network device had not been receiving any packet for a while, it is possible that the primary tunnel was in a bad network condition or failed to work. In order to maintain the connection with the second network device, the first network device may temporarily transfer data packets by using one or more other tunnels established between the first network device and the second network device.

In another embodiment, the data type of the first parameter is the number of data packets transmitted. Therefore, TH1 may be a limit of the number of data packets transmitted. If the number of data packets transmitted by first network device 101 reaches the limit without receiving packets through the primary tunnel, process 306 may be performed. If first network device 101 does receive any packet within TH1, then process 303 may be performed.

There is no limitation on the data type of the first parameter. It need not be time or the number of data packets transmitted. The first parameter may be any data type such that the network performance of the primary tunnel can be monitored with TH1, which is the limit for receiving a packet through the primary tunnel.

For simplification, the data type of the first parameter is time and TH1 is the time limit for receiving a packet through the primary tunnel in the illustrated embodiments.

There are myriad reasons such that first network 101 device may not receive packets through the primary tunnel. For example, data packets drop during the data packet transmission through the primary tunnel, malfunction of the primary tunnel, or malfunction of the second network device.

In one embodiment, a first counter is introduced to monitor whether the first parameter reaches TH1.

In one variant, no counter is introduced to monitor the first parameter. Instead, a score is applied to the primary tunnel, which relates to the network performance of the primary tunnel. If the score reaches the first threshold, further process may be performed.

In process 303, first network device 101 may transmit the OPs through the primary tunnel.

In process 304, at least one duplicated data packet (hereafter "DP") may be duplicated from OP pending to be transmitted through the primary tunnel. The packet structure of the at least one DP may be the same or similar with that of the corresponding OP. The OP and the at least one DP may be an IP packet, Ethernet frame, X.25 packet, etc.

In process 305, first network device 101 may transmit the OP through the primary tunnel.

In process 306, first network device 101 may transmit the at least one DP through at least one auxiliary tunnel.

In one variant, first network device 101 may perform process 305 before process 304.

In another variant, first network device 101 may perform process 306 before process 305.

In one variant, first network device 101 may send the heartbeat packet along with the OP through the primary tunnel in process 305.

In another variant, between processes 304 and 306, first network device 101 may further send the heartbeat packet through the primary tunnel.

Figure 3B:
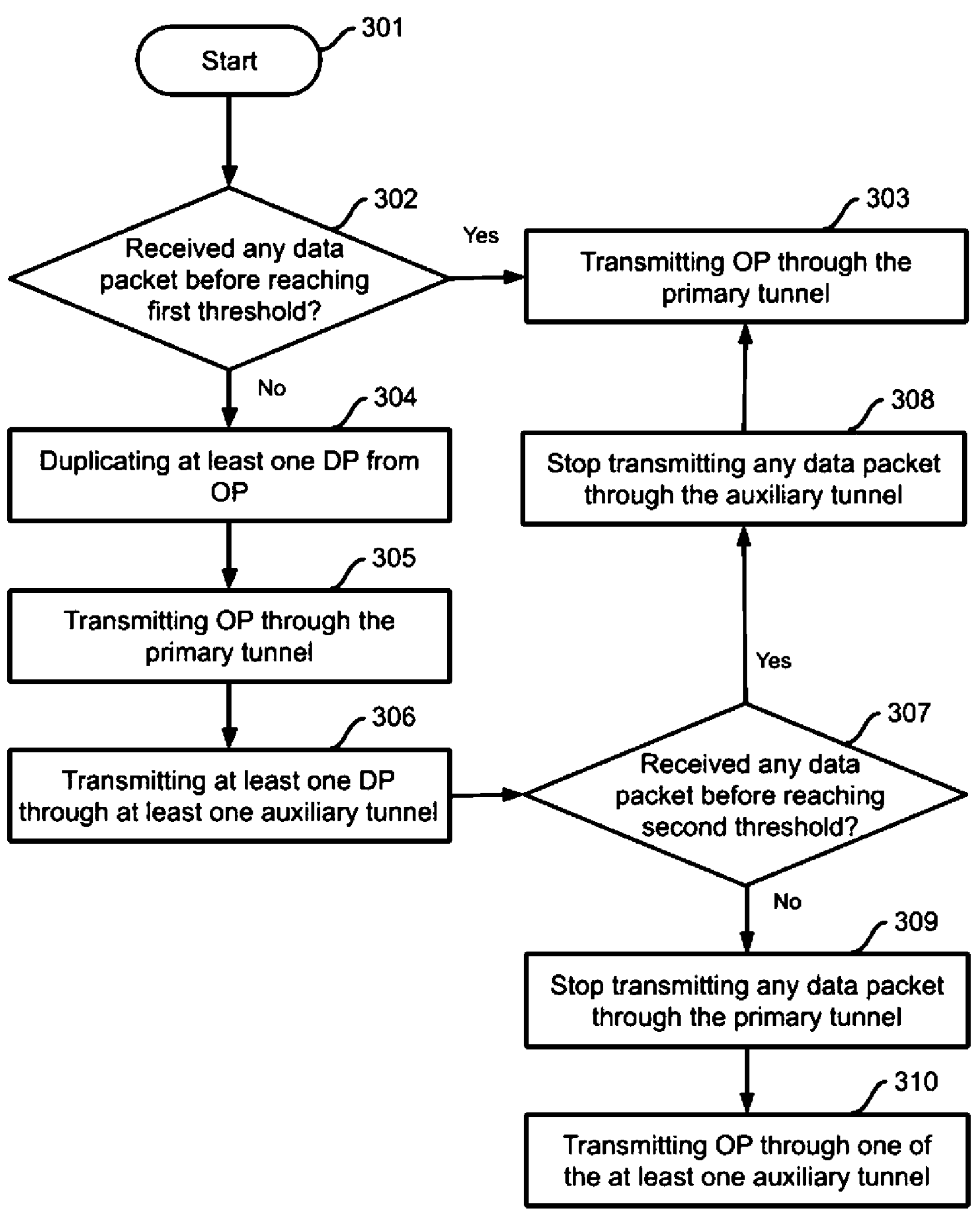
FIG. 3B is a flowchart illustrating another embodiment of the present invention.

FIG. 3B is a flowchart illustrating one of the embodiments in the present invention. Similar to the process illustrated in FIG. 3A, processes 301-306 may be performed in the specific time period. However, further processes may be performed.

In process 307, first network device 101 may determine if a second parameter has reached a second threshold (hereafter "TH2"). If first network device 101 does receive any packet within TH2, then processes 308 and 303 may be performed. Otherwise, processes 309 and 310 may be performed.

The data type of the second parameter should be the same as that of the first parameter. In the illustrated embodiment, the data type of the first parameter and the second parameter are time whereas TH1 and TH2 are the time limit for receiving a packet through the primary tunnel.

In one preferred embodiment, TH2 is higher than TH1. For example, if the data type of the first and second parameter is time, TH1 and TH2 may be the time limit for receiving a packet through the primary tunnel, then TH1 may be 900 ms while TH2 may be 10 s. It is preferable to set the value of TH1 and TH2 at a suitable value such that packet loss can be reduced among different kinds of connection, such as cellular connection, a Low Earth orbit (LEO) connection, and broadband.

In another embodiment, the value of TH2 is the same or similar to TH1.

In one embodiment, the first counter and a second counter are introduced to monitor whether the first parameter and the second parameter have reached TH1 and TH2 respectively.

In another embodiment, only the first counter or the second counter is introduced to monitor the first parameter or the second parameter, which is the only parameter being monitored to determine whether TH1 or TH1+TH2 have been reached.

In one variant, a score is applied to the primary tunnel. If the score reaches the second threshold, further process may be performed.

In process 308, when the second parameter has reached TH2, first network device 101 may stop transmitting any data packet through the at least one auxiliary tunnel, and in process 303, transmit OP through the primary tunnel again.

In process 309, first network device 101 may stop transmitting any data packet through the primary tunnel.

In process 310, first network device 101 may transmit OP through a replacement tunnel, which is a tunnel of the at least one auxiliary tunnel, and monitor the network performance of the replacement tunnel by beginning process 301. First network device 101 may select the one of the at least one auxiliary tunnel based on one or more of the following: user preference, latency, speed, cost, availability, security, and features that tunnels can perform.

In one variant, first network device 101 may perform process 310 before process 309.

In another variant, first network device 101 may perform process 309, followed by process 310 after a time interval. First network device 101 may continue to transmit at least one DP through the at least one auxiliary tunnel before process 310.

Figure 4:
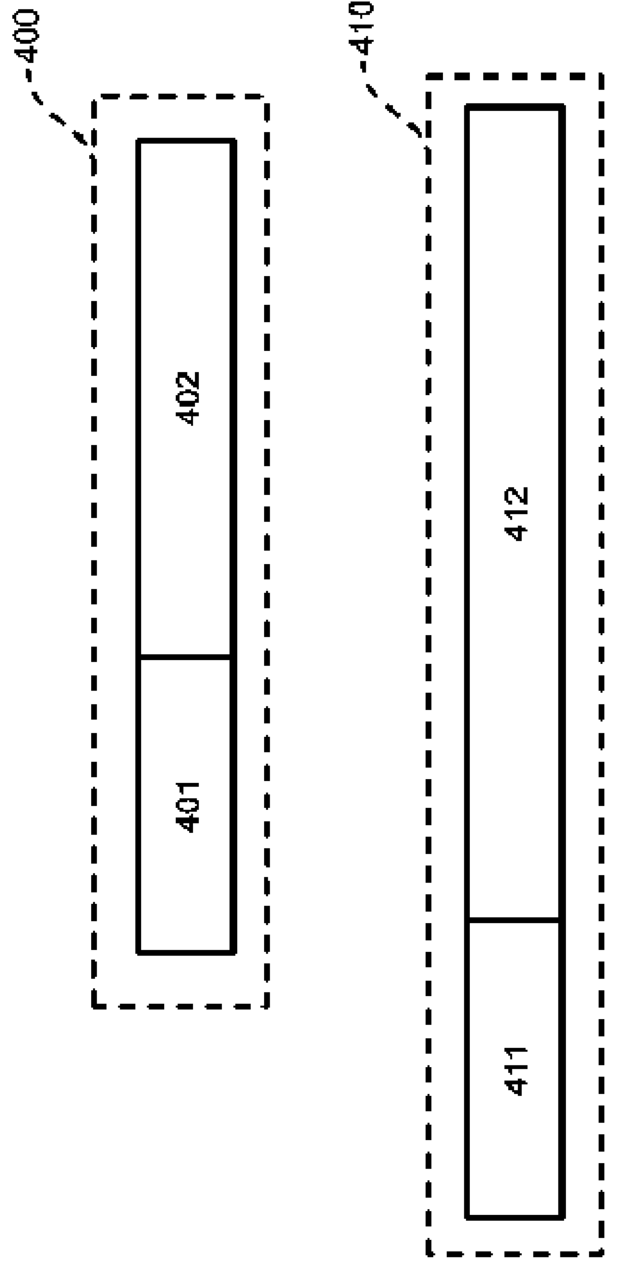
FIG. 4 illustrates packet structures of the data packets being transmitted according to the embodiments in the present invention.

FIG. 4 illustrates packet structures of the data packets being transmitted according to the embodiments in the present invention.

First network device 101 may receive data packets from first local device 101*a*; each of the data packets may have a packet structure similar to packet structure 400. Packet structure 400 comprises an IP header 401 and payload 402. IP header 401 may comprise identifying information such as a source IP address and a destination IP address.

When receiving a data packet from first local device 101*a*, first network device 101 may further encapsulate the data packet as an encapsulated data packet, and transmit the encapsulated data packet to second network device 102. The encapsulated data packet may be the OP or the at least one DP as described in the present invention.

Each OP and DP described in the present invention may have the same packet structure similar to packet structure 410. Packet structure 410 comprises an IP header 411 and payload 412. IP header 411 may comprise identifying information such as a source IP address and a destination IP address, and payload 412 may be the data packet received from first local device 101*a*.

In one variant, IP header 411 may further comprise other information for describing the data packet, directing or routing the data packet to a particular route to reach the destination.

In one embodiment, IP header 411 may further comprise a global sequence number and a local sequence number.

In another embodiment, the global sequence number and the local sequence number may be part of payload 412.

When duplicating an OP as at least one DP, the OP and the at least one DP may have the same global sequence number but a different local sequence number such that first network device 101 may be utilized to assist in packet transmission, buffering, and reordering operations.

There are no limitations as to how the global sequence number and the local sequence number are generated. The global sequence number and the local sequence number may be generated randomly by hashing the payload, etc. For example, the sequence number of each of the data packets transmitted from the first network device may be generated by increasing the sequence number of the previous data packets by one.

Figure 5:
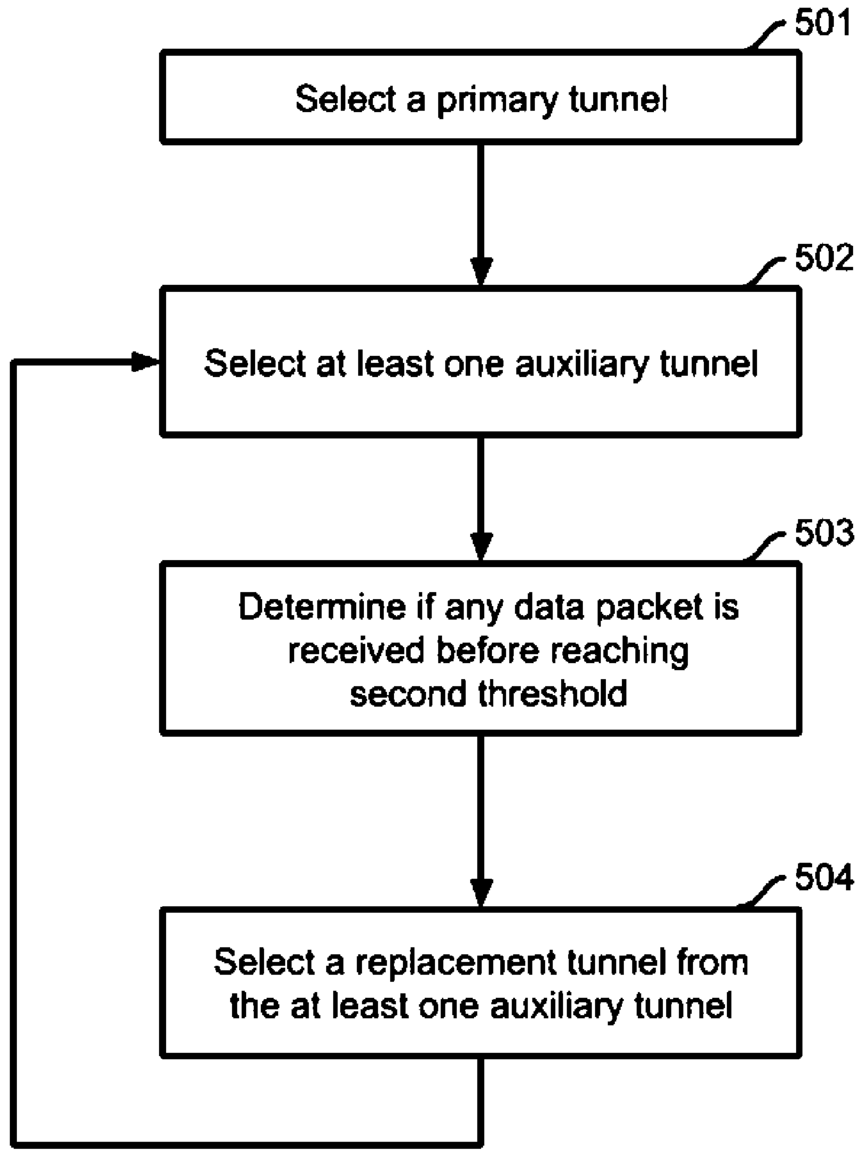
FIG. 5 is a flowchart illustrating one of the embodiments in the present invention.

FIG. 5 is a flowchart demonstrating a process performed by the first network device for selecting tunnels as described in the embodiments of the present invention.

In process 501, first network device 101 may select the primary tunnel.

In process 502, first network device 101 may select the at least one auxiliary tunnel. The at least one auxiliary tunnel is the at least one tunnel established between first network device 101 and second network device 102 other than the primary tunnel.

In one embodiment, the primary tunnel and/or the at least one auxiliary tunnel may be selected by first network device 101 for transmitting data packets. First network device 101 may select the primary tunnel and/or the at least one auxiliary tunnel based on one or more of the following: user preference, latency, speed, cost, availability, security, and features that tunnels can perform. For example, if the primary tunnel is selected based on latency, first network device 101 may utilize the information of the heartbeat packets for selecting the primary tunnel.

In another embodiment, first network device 101 may select the primary tunnel and/or the at least one auxiliary tunnel randomly.

It should be noted that first network device 101 may use more than one primary tunnels for the data packet transmission at the same time, and monitor the network performance for each of the primary tunnels concurrently. For example, tunnels 120*a*, 120*b*, and 120*c* are a first primary tunnel, a second primary tunnel, and a third primary tunnel used for transmitting the original data packets. When the network performance of one of the primary tunnels becomes unacceptable, first network device 101 may select at least one auxiliary tunnel for that primary tunnel for further processing. During the process for selecting the at least one auxiliary tunnel, first network device 101 may consider whether each of the at least one auxiliary tunnel has been used as an auxiliary tunnel for another primary tunnel.

In one embodiment, in order to guarantee network performance during the data packet transmission, the tunnel that has already been selected as a replacement tunnel for another primary tunnel will not be considered here. For example, tunnels 120*a* and 120*b* are a first primary tunnel and a second primary tunnel respectively. If the network performance of both the first primary tunnel and the second primary tunnel become unacceptable, tunnels 120*c* and 120*d* may be respectively selected as auxiliary tunnels for both the first primary tunnel and the second primary tunnel.

In another embodiment, a tunnel may be selected as an auxiliary tunnel even if the tunnel has already been selected as a replacement tunnel for another primary tunnel. For example, tunnels 120*a* and 120*b* are a first primary tunnel and a second primary tunnel respectively. If the network performance of both the first primary tunnel and the second primary tunnel becomes unacceptable, tunnel 120*c* may be selected as an auxiliary tunnel for both the first primary tunnel and the second primary tunnel.

In process 503, first network device 101 may determine if any packet is received before reaching the second threshold. If no packet is received before the second threshold is reached, first network device 101 may further perform process 504.

In process 504, first network device 101 may select a replacement tunnel from the at least one auxiliary tunnel. The replacement tunnel is an alternative tunnel for replacing the primary tunnel and transmitting the data packets to second network device 102.

In one preferable embodiment, the replacement tunnel is a tunnel with the desired network performance.

FIG. 6A-6E is a series of timing diagrams illustrating data packet transmission between network devices according to various embodiments of the present invention. In the illustrated embodiments, first local device 101*a* may transmit data packets to a designated device, which is reachable through second network device 102, such as second local device 102*a*. When first network device 101 receives the data packets from first local device 101*a*, first network device 101 may transmit the data packets to second network device 102 through the tunnel established between first network device 101 and second network device 102. All the time indicated in the figure is only for illustrative purposes, there is no limitation that the embodiments of the present inventions should be bound to the time described therein. FIG. 6A-6E should be considered in conjunction with FIG. 1A, FIG. 1B, FIG. 2A, FIG. 2B, FIG. 3A and FIG. 3B.

The tunnel established between first network device 101 and second network device 102 may be divided, grouped, or classified into a primary tunnel and at least one auxiliary tunnel. The primary tunnel is the tunnel originally selected for the data packet transmission, and the at least one auxiliary tunnel may be introduced for the data packet transmission when the network condition of the primary tunnel worsens. For better understanding, dotted lines and dashed lines are used in FIG. 6A-6E to represent, respectively, the primary tunnel and the at least one auxiliary tunnel being used for the data packet transmission.

Figure 6B:
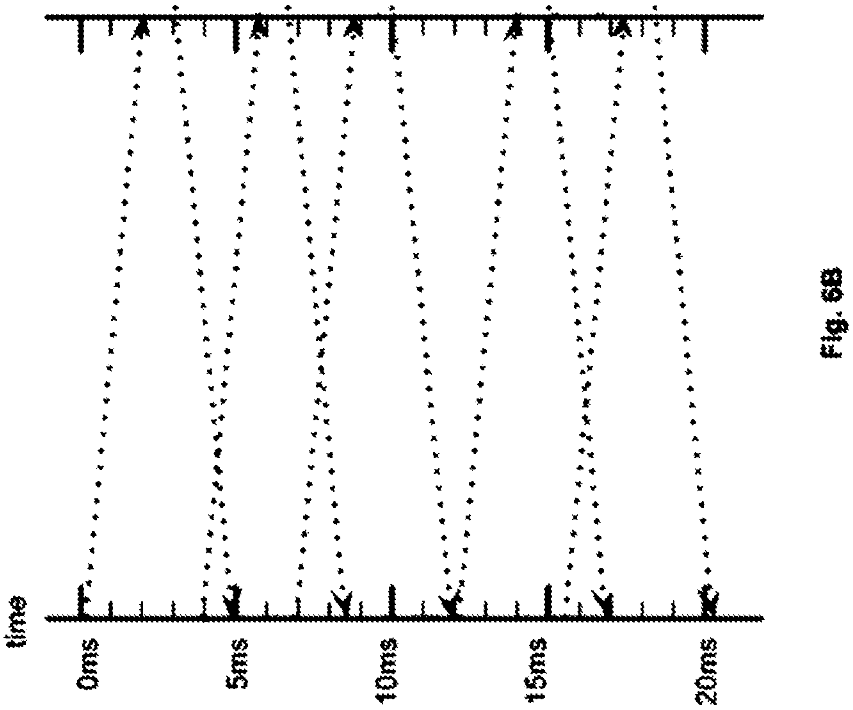
FIG. 6A-6E is a series of timing diagrams illustrating data packet transmission between network devices according to various embodiments of the present invention.
Figure 6A:
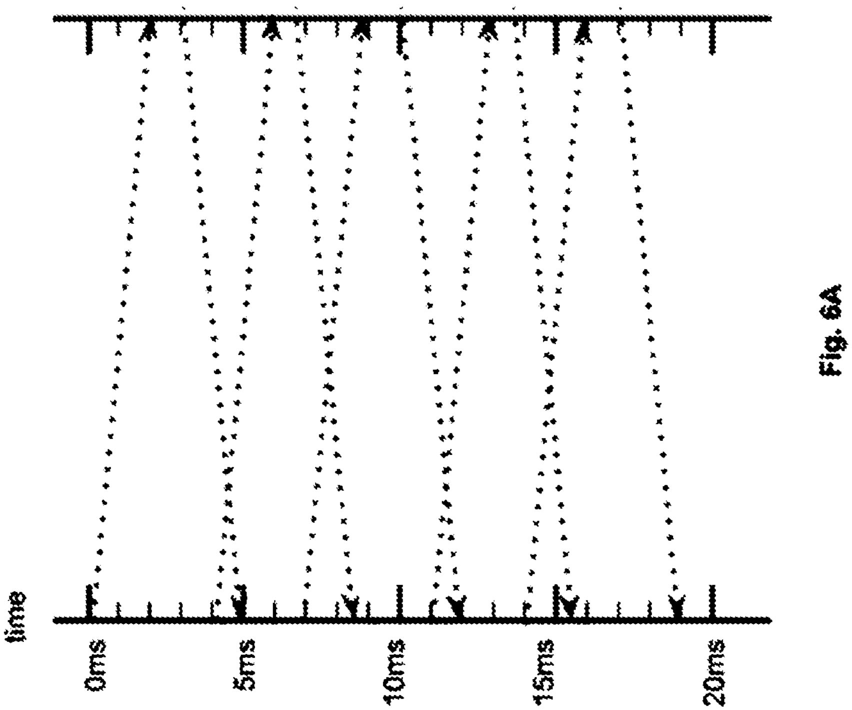

FIG. 6A is a timing diagram illustrating data packet transmission between network devices through the primary tunnel according to the embodiments of the present invention. Assuming that a window size is large enough such that first network device 101 may transmit data packets to second network device 102 through the primary tunnel continuously without waiting for an acknowledgment from second network device 102. When receiving at least one data packet from first local device 101*a*, first network device 101 may transmit data packets to second network device 102 at times 0 ms, 4 ms, 7 ms, 11 ms, and 14 ms, and receive the corresponding acknowledgment from second network device 102 at time 5 ms, 8.5 ms, 12 ms, 15.5 ms, and 19 ms. The time mentioned above is for illustrative purposes only; the time may vary according to various network conditions. Under an acceptable network condition, first network device 101 may receive at least one acknowledgment corresponding to one or more data packets being transmitted previously, which indicates the network performance of the primary tunnel is acceptable.

FIG. 6B is another diagram similar to FIG. 6A, which illustrates data packet transmission between network devices through a primary tunnel according to the embodiments of the present invention. The only difference is the limited window size compared with FIG. 6A. Given the limited window size, first network device 101 must wait for an acknowledgment from second network device 102, before it may transmit another data packet to second network device 102 at a time of 12 ms.

In one variant, TCP acceleration may be applied on second network device 102 such that second network device 102 may send out the acknowledgment to first network device 101 before receiving the corresponding acknowledgment from the designated device. As a result, the overall data packet transmission becomes more efficient.

Figure 6C:
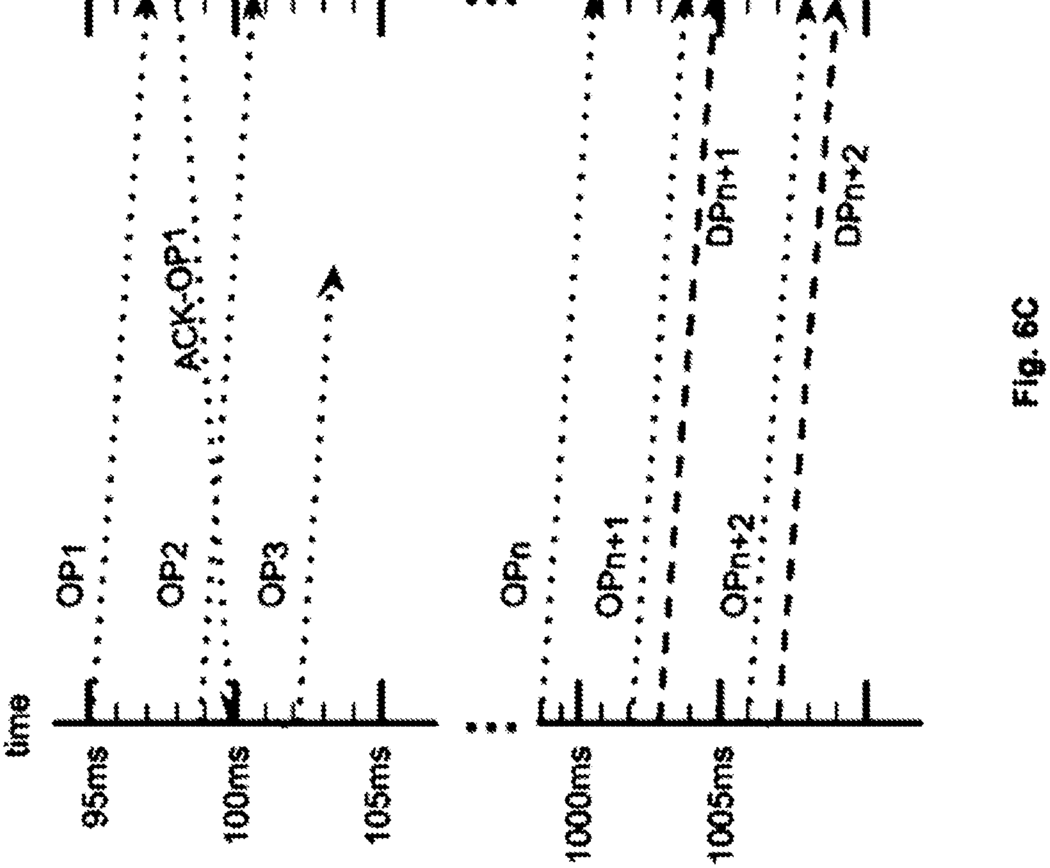

FIG. 6C is a timing diagram illustrating data packet transmission between network devices according to the embodiments of the present invention when the network condition of the primary tunnel worsens. For simplification, the window size is assumed to be large enough such that first network device 101 may transmit data packets to second network device 102 through the primary tunnel continuously without waiting for an acknowledgment from second network device 102.

When first network device 101 keeps transmitting out the data packets to second network device 102, at least one acknowledgment corresponding to one or more data packets transmitted is expected to be received from time to time. However, there may be other reasons for not receiving the data packet, apart from a malfunction of the primary tunnel. These may be caused by variations in the network conditions. Therefore, it is not accurate to define the primary tunnel as malfunctioning simply because no packet is received through the primary tunnel.

In one embodiment, first network device 101 may determine if no packet, including an acknowledgment or heartbeat packet, was received from second network device 102 within TH1. For example, OP1 is transmitted out through the primary tunnel at the time of 10 ms, and first network device 101 receives the corresponding acknowledgment (ACK-OP1) from second network device 102 through the primary tunnel at the time of 100 ms, and no longer receives any acknowledgment thereafter. If TH1 is 900 ms, then processes 304-306 may be performed at the time of 1000 ms.

When TH1 is reached, the primary tunnel will not be replaced at once. Instead, first network device 101 may transmit OP and at least one DP through the primary tunnel and the at least one auxiliary tunnel respectively.

As illustrated in process 304, first network device 101 subsequently duplicates OP to form at least one DP. In process 305, first network device 101 transmits OP through the primary tunnel, and in process 306, transmits the at least one DP through the at least one auxiliary tunnel.

For example, first network device 101 may duplicate at least one DPn+1 from an original data packet OPn+1. First network device 101 may then transmit OPn+1 through the primary tunnel at the time of 1002 ms and transmit the at least one DPn+1 through the at least one auxiliary tunnel at the time of 1003 ms. Similarly, first network device 101 may duplicate at least one DPn+2 from another original data packet OPn+2. First network device 101 may then transmit OPn+2 through the primary tunnel at the time 1006 ms, and the at least one DPn+2 through the at least one auxiliary tunnel at the time 1007 ms.

In one variant, the at least one DP may be transmitted after the transmission of the OP.

In another variant, the OP may be transmitted concurrently with the transmission of the at least one DP.

There is no limitation on how the data packets are being transmitted. The OPn+1 may be the OP2, which is the data packet transmitted previously but the corresponding acknowledgment has yet to be received.

Figure 6E:
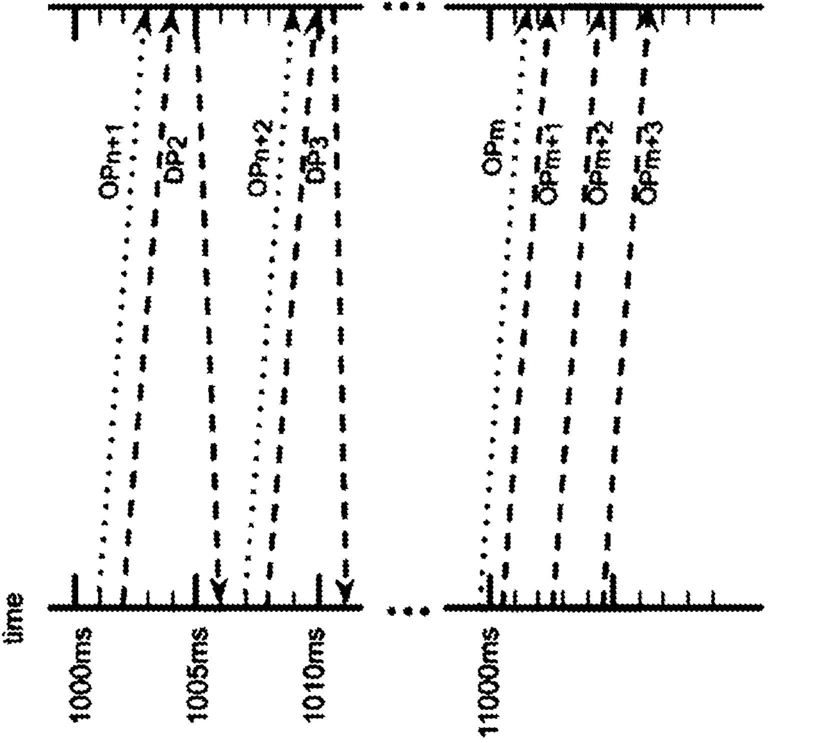
Figure 6D:
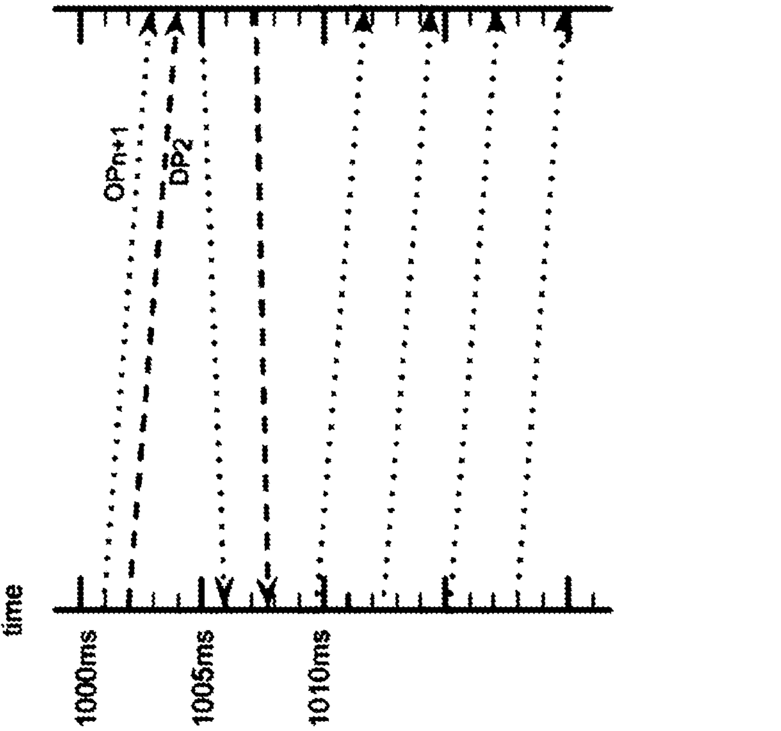

FIG. 6D is a timing diagram illustrating data packet transmission between network devices according to the embodiments of the present invention. In one embodiment, after transmitting OP and at least one DP through the primary tunnel and the at least one auxiliary tunnel respectively, it is possible for first network device 101 to receive a packet from second network device 102 through the primary tunnel between TH1 and TH2. For example, TH1 and TH2 are 900 ms and 10 s respectively, and first network device 101 receives an acknowledgment such as ACK-OPn, from second network device 102 at the time of 1006 ms through the primary tunnel. Since there is no malfunction of the primary tunnel, first network device 101 may perform processes 308 and 303 to stop transmitting data packets through the at least one auxiliary tunnel, and resume the data packet transmission through the primary tunnel.

In another embodiment, first network device 101 may not receive any packet from second network device 102 through the primary tunnel between TH1 and TH2.

FIG. 6E is a timing diagram illustrating data packet transmission between network devices according to the embodiments of the present invention.

As illustrated in FIG. 6E, after TH1, first network device 101 may continue transmitting OP, such as OPn+1, OPn+2, . . . , OPn through the primary tunnel, and transmitting the at least one DP, such as DP2, DP3, . . . , through the at least one auxiliary tunnel. However, it is possible that first network device 101 has yet to receive any packet through the primary tunnel before TH2 is reached.

First network device 101 may then proceed with processes 309 and 310 to stop transmitting any data packet through the primary tunnel and instead, transmitting OP through the at least one auxiliary tunnel.

In one embodiment, first network device 101 may also perform process 504, and transmit OP(s) through the replacement tunnel instead. For example, tunnel 120*a* may be a primary tunnel, and tunnels 120*b*, 120*c* and 120*d* are selected as a first auxiliary tunnel, a second auxiliary tunnel, and a third auxiliary tunnel. When first network device 101 does not receive any packets through the primary tunnel before TH2 is reached, it may then select tunnel 120*c* as a replacement tunnel. First network device 101 may then proceed to transmit OP, such as OPm, OPm+1 . . . through the replacement tunnel.

The invention claimed is:

1. A method for performing data transmission at a first network device, comprising:

a. transmitting original data packets to a second network device through a primary tunnel;

b. when no packet is received before a first parameter reaches a first threshold:

i. duplicating the original data packets, each as at least one duplicated data packet;

ii. transmitting each of the original data packets to the second network device through the primary tunnel; and iii. transmitting each of the at least one duplicated data packet to the second network device through at least one auxiliary tunnel; and c. when no packet is received before a second parameter reaches a second threshold:

i. transmitting each of the original data packets to the second network device through a replacement tunnel; and ii. stop transmitting any data packets to the second network device through the primary tunnel;

wherein:

the original data packets are pending to be transmitted;

the replacement tunnel is a tunnel of the at least one auxiliary tunnel;

the second threshold is greater than the first threshold.

2. The method of claim 1, further comprising:

d. when a packet is received between the first threshold and the second threshold:

i. transmitting each of the original data packets to the second network device through the primary tunnel; and ii. stop transmitting any data packets to the second network device through the at least one auxiliary tunnel.

3. The method of claim 1, wherein the first parameter and the second parameter are time.

4. The method of claim 3, wherein the second threshold is 10 seconds.

5. The method of claim 1, wherein the at least one auxiliary tunnel may be selected based on one or more of the following: user preference, latency, speed, cost, availability, security, and features that tunnels can perform.

6. The method of claim 1, wherein the packet may be a data packet, an acknowledgment, or a heartbeat packet.

7. The method of claim 1, wherein each of the original data packets may be transmitted concurrently with the corresponding at least one duplicated data packet.

8. The method of claim 1, wherein the first parameter and the second parameter are monitored by a first counter and a second counter.

9. The method of claim 1, wherein each of the original data packets and the corresponding at least one duplicated data packet have the same global sequence number but a different local sequence number.

10. The method of claim 1, further comprises:

e. monitoring the network performance on the replacement tunnel.

11. A system for performing data transmission, comprising:

a first network device, comprising:

at least one first processing unit;

a plurality of first network interfaces; and at least one first non-transitory computer readable storage medium storing program instruction executable by at least one first processing unit for:

a. transmitting original data packets to a second network device through a primary tunnel;

b. when a first parameter reaches a first threshold and no packet is received before:

i. duplicating the original data packets, each as at least one duplicated data packet;

ii. transmitting each of the original data packets to the second network device through the primary tunnel; and iii. transmitting each of the at least one duplicated data packet to the second network device through at least one auxiliary tunnel; and c. when a second parameter reaches a second threshold and no packet is received before:

i. transmitting each of the original data packets to the second network device through a replacement tunnel; and ii. stop transmitting any data packets to the second network device through the primary tunnel; and the second network device, comprising:

at least one second processing unit;

a plurality of second network interfaces; and at least one second non-transitory computer readable storage medium storing program instruction executable by at least one second processing unit;

wherein:

the original data packets are pending to be transmitted;

the replacement tunnel is a tunnel of the at least one auxiliary tunnel;

the second threshold is greater than the first threshold.

12. The system of claim 11, wherein the at least one first non-transitory computer readable storage medium further store program instruction executable by the at least one first processing unit for:

d. when a packet is received between the first threshold and the second threshold:

i. transmitting each of the original data packets to the second network device through the primary tunnel; and ii. stop transmitting any data packets to the second network device through the at least one auxiliary tunnel.

13. The system of claim 11, wherein the first parameter and the second parameter are time.

14. The system of claim 13, wherein the second threshold is 10 seconds.

15. The system of claim 11, wherein the at least one auxiliary tunnel may be selected based on one or more of the following: user preference, latency, speed, cost, availability, security, and features that tunnels can perform.

16. The system of claim 11, wherein the packet may be a data packet, an acknowledgment, or a heartbeat packet.

17. The system of claim 11, wherein each of the original data packets may be transmitted concurrently with the corresponding at least one duplicated data packet.

18. The system of claim 11, wherein the first parameter and the second parameter are monitored by a first counter and a second counter.

19. The system of claim 11, wherein each of the original data packets and the corresponding at least one duplicated data packet have the same global sequence number but a different local sequence number.

20. The system of claim 11, wherein the at least one first non-transitory computer readable storage medium further store program instruction executable by the at least one first processing unit for:

e. monitoring the network performance on the replacement tunnel.

* * * * *